(12) United States Patent
Von Thienen et al.

(10) Patent No.: US 11,258,275 B2
(45) Date of Patent: Feb. 22, 2022

(54) INDUSTRIAL TRUCK

(71) Applicant: Jungheinrich Aktiengesellschaft, Hamburg (DE)

(72) Inventors: Nils Von Thienen, Hamburg (DE); Christian Czerkies, Quickborn (DE); Hans-Peter Claussen, Bad Bramstedt (DE)

(73) Assignee: JUNGHEINRICH AKTIENGESELLSCHAFT, Hamburg (DE)

( * ) Notice: Subject to any disclaimer, the term of this patent is extended or adjusted under 35 U.S.C. 154(b) by 176 days.

(21) Appl. No.: 16/594,649

(22) Filed: Oct. 7, 2019

(65) Prior Publication Data

US 2020/0112180 A1    Apr. 9, 2020

(30) Foreign Application Priority Data

Oct. 8, 2018   (DE) .................... 10 2018 124 752.4

(51) Int. Cl.
*H02J 7/00*     (2006.01)
*H01M 10/42*    (2006.01)
*H01M 10/48*    (2006.01)

(52) U.S. Cl.
CPC ......... *H02J 7/0021* (2013.01); *H01M 10/425* (2013.01); *H01M 10/48* (2013.01); *H01M 2010/4271* (2013.01); *H01M 2220/20* (2013.01)

(58) Field of Classification Search
USPC ....................................................... 320/109
See application file for complete search history.

(56) References Cited

U.S. PATENT DOCUMENTS

| | | | | |
|---|---|---|---|---|
| 2012/0043819 A1* | 2/2012 | Kang | ........................ | H02J 3/32 307/80 |
| 2013/0175857 A1* | 7/2013 | Shreevani | ............. | B60L 3/0046 307/9.1 |
| 2014/0183939 A1* | 7/2014 | Jiang | ........................ | B60L 7/10 307/9.1 |
| 2015/0318725 A1* | 11/2015 | Brockman | ................ | H02J 7/00 340/636.1 |
| 2018/0083253 A1* | 3/2018 | Dulle | ....................... | B60L 58/15 |
| 2020/0112180 A1* | 4/2020 | Thienen | .............. | H01M 10/482 |

FOREIGN PATENT DOCUMENTS

EP         3103182 B1      4/2018

OTHER PUBLICATIONS

German Search Report for German Application No. 10 2018 124 752.4, dated Oct. 8, 2018, German Patent and Trademark Office, Munich, Germany.

* cited by examiner

*Primary Examiner* — Mohammed Alam
(74) *Attorney, Agent, or Firm* — M&B IP Analysts, LLC

(57) ABSTRACT

An industrial truck including a battery and a battery management system connected to the battery and powered by the battery. The battery includes a plurality of battery stacks each having battery cells connected in series with each other, characterized by a control unit adapted to selectively connect one or more of the battery stacks to the battery management system or to disconnect it from the battery management system.

7 Claims, 2 Drawing Sheets

INDUSTRIAL TRUCK

Figure 1:
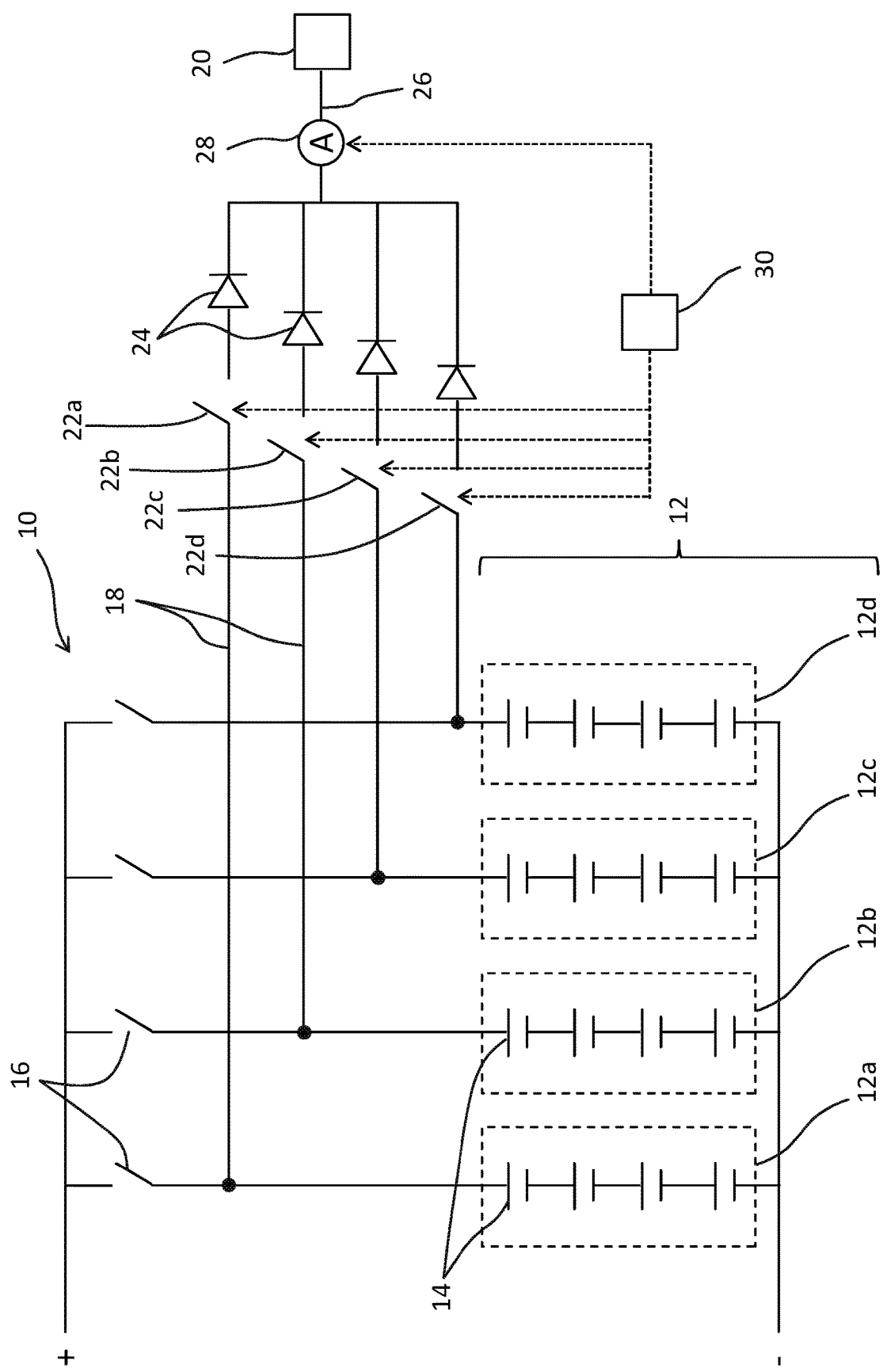

This application claims the benefit of German patent application No. 10 2018 124 752.4 filed on Oct. 8, 2018, now pending, the contents of which are hereby incorporated by reference.

The present disclosure concerns an industrial truck comprising a battery and a battery management system connected to the battery and powered by the battery, the battery comprising a plurality of battery stacks each having battery cells connected in series with each other.

The industrial truck is used to transport loads. Such industrial trucks usually have a drive section and a load section, with the battery and an electric drive usually located in the drive section, while the load section comprises load carrying means. For example, the industrial truck may be a forklift truck, and the load section may have a height-adjustable lifting mast with a load fork. In the case of electrically driven industrial trucks, the battery serves in particular to supply power to the drive and thus to move the truck and, if necessary, to lift the mast. The battery management system itself is also supplied with energy by the battery. The battery management system is a generally known control system for monitoring, regulating and protecting the battery cells of the battery. In particular, the battery management system serves to detect and monitor the state of charge of the battery. In known batteries, the battery cells are usually grouped in so-called battery stacks and connected in series, with the individual battery stacks in turn connected in parallel.

In well-known industrial trucks, the battery management system is usually supplied with energy from the battery stack with the highest voltage. Diodes can be used to determine from which of the battery stacks the battery management system is supplied. If some or all of the battery stacks have similar voltages, it is usually not possible to make a reliable statement about which of the battery stacks the battery management system is currently supplied from due to the usually selected type of connection. This has several disadvantages. On the one hand, due to the supply of the battery management system from only one battery stack at a time, this battery stack is permanently more heavily loaded, which can lead to a faster failure of the battery cells of the battery stack. On the other hand, the state of charge cannot be determined reliably if it cannot be reliably determined from which of the battery stacks the battery management system draws its energy.

On the basis of the above-mentioned state of the art, the underlying task of the disclosed embodiments is to provide an industrial truck whose battery has the longest possible service life.

The disclosed embodiments would solve the task by means of an industrial truck according to claim 1. Advantageous designs are the subject of the dependent claims, the description and the figures.

The inventive industrial truck of the type mentioned above comprises a control unit which is designed to either connect one or more of the battery stacks to the battery management system or to separate them from the battery management system.

As mentioned above, the battery of the industrial truck comprises several battery stacks, composed in particular of battery cells connected in series. The battery stacks, in turn, can be connected together in parallel to the total capacity of the battery. The battery management system is powered by the battery. As already mentioned, the battery can be used in particular to supply power to the drive. In contrast to the state of the art described above, however, the battery stacks are not all permanently connected to the battery management system, but can be optionally connected to the battery management system using the control unit according to the disclosed embodiments. The control unit can connect or disconnect the battery stacks, in particular each of the battery stacks, individually to the battery management system.

In accordance with the disclosed embodiments, the control unit thus switches on individual battery stacks to supply the battery management system or switches off individual battery stacks from the battery management system supply. In other words, the battery stacks of the inventive industrial truck can be independently connected to or disconnected from the battery management system. The control unit can control the load on the individual battery stacks—and thus on the battery cells within the respective battery stack. For example, a battery stack that was already heavily loaded in the past can be separated from the battery management system by the control unit. This means that the battery is initially not further used. The control unit can therefore be used to switch the battery stacks on and off in a controlled manner to achieve an even load on all battery stacks. Switching on a battery stack always means connecting the battery stack to the battery management system and switching off a battery stack always means disconnecting the battery stack from the battery management system.

The optional connection or disconnection of the battery stacks with/from the battery management system takes place in particular during regular operation of the battery management system. During regular operation of the battery management system, for example, the drive of the industrial truck is activated and the industrial truck is thus moved and/or the load section of the industrial truck is retracted or extended or the industrial truck is in standby. The inventive selective connecting or disconnecting of the battery stacks in particular does not take place during standby operation of the battery management system.

In addition, the control unit knows from which battery stack the battery management system is supplied with energy. Namely, only from the battery stack or stacks connected to the battery management system by the control unit. Thus, the state of charge of the individual battery stacks and in particular of the entire battery can be determined more reliably. Especially if only one battery stack is connected to the battery management system, the state of charge of the battery stack connected to the battery management system can be reliably determined from the supply current and especially from the supply voltage of the battery management system. The state of charge of the battery or the individual battery stacks can be determined via the control unit or the battery management system. In particular, the control unit can be part of the battery management system. For example, the control unit may comprise a microcontroller with software. In particular, the control unit may be designed to prevent the battery stacks from interfering with each other. For example, in the supply lines leading from the battery stacks to the battery management system, a diode may be provided to prevent a charging current flowing from one of the battery stacks to another of the battery stacks. In particular, exactly one battery stack can always be connected to the battery management system via the control unit. Several battery stacks, in particular all of them, can also be connected simultaneously to the battery management system via the control unit.

According to one design, the control unit is configured to either connect the battery stacks to the battery management system or disconnect them from the battery management system depending on their charge status. According to this design, the control unit connects the individual battery stacks to the power supply of the battery management system depending on their respective state of charge. For example, the control unit can be designed to determine the charge status of the individual battery stacks and connect the battery stack to the battery management system with the highest charge status. The control unit can also be designed to connect the battery stacks with the battery management system whose charge states exceed a defined threshold value and to separate the battery stacks from the battery management system whose charge states fall below this threshold value. The threshold value can, for example, be 50% of the nominal or maximum charge. By connecting and disconnecting the battery stacks to/from the battery management system depending on the state of charge, the control unit can ensure uniform discharge of the battery.

According to one design, the control unit is designed to take the supply current of the battery management system into account for determining the state of charge. In particular, the control unit determines the state of charge or the states of charge of the battery stack(s) connected to the battery management system. In particular, the control unit can alternately connect the individual battery stacks of the battery to the battery management system, whereby the control unit or the battery management system can determine a charge state of the entire battery from the charge states of the individual battery stacks. The supply current can be measured via a current meter, whereby a common current meter can be provided for all battery stacks or a single current meter for each of the battery stacks. For example, each of the supply lines extending between one of the battery stacks and the battery management system may have one amperemeter each. According to this design, a current meter is arranged in a common supply line leading from the battery stacks to the battery management system. In particular, only one current meter can be provided, which can be used to determine the state of charge of the battery stack or stacks connected to the battery management system. The already mentioned individual supply lines of the battery stacks can be combined to form the common supply line.

According to a further design, the control unit is designed to take one or more of the following sets of parameters into account when determining the state of charge: stack voltages of the battery stacks, cell voltages of the battery cells. In addition to the supply current mentioned, the control unit can therefore also take into account the stack voltages of the battery stacks connected and/or the cell voltages of the battery cells of the battery stacks connected. This makes it more reliable to determine the state of charge of the respective battery stacks or the total battery capacity.

According to one design, the control unit is designed to connect the battery stacks to the battery management system or to disconnect them from the battery management system depending on one or more of the following set of parameters: Time, stack voltages of the battery stacks, cell voltages of the battery cells. The control unit can therefore switch the individual battery stacks on or off depending on a time factor. For example, the age of the battery cells of a battery stack can be taken into consideration as a time factor, whereby the control unit can be designed to connect battery rows with younger battery cells to the supply of the battery management system rather than battery stacks with older battery cells. Thus, the age of the battery cells can be taken into account and the battery life can be increased. A temporal control can also involve the individual battery stacks being switched on and off alternately at a certain time interval from each other to supply the battery management system. For example, a first battery stack can be connected to the battery management system by the control unit for a certain period of time, while the other battery stacks are separated from the battery management system by the control unit. Subsequently, the control unit can connect a second battery stack to the battery management system and disconnect the first battery stack from the battery management system. Upon expiry of the defined time period, the second battery stack can be disconnected from the battery management system and a third battery stack can be connected to the battery management system, again for a specified time period. For example, the time period can be 10 minutes. For example, the control unit can also control the battery stacks depending on the energy requirements of the battery management system. During the start-up phase of the battery management system, in particular, a large number of battery stacks, in particular all battery stacks, can be connected to supply the battery management system. The control unit can also take the stack voltage of the battery stack or the cell voltages of the battery cells of the battery stacks into account. The control unit can also do this in particular to determine the state of charge, as mentioned above. However, according to the present design, these voltages can also serve as control parameters for switching on and off without explicitly determining the state of charge.

According to one design, supply lines running between the battery stacks and the battery management system each have a switch, whereby the control unit is designed to control the switches independently of each other. Via the control unit, the individual battery stacks can be switched on or off by means of the switches to supply the battery management system. The control unit can therefore use the switches to connect or disconnect the respective battery stacks to the battery management system. The switches can, for example, be formed by a transistor or a relay or similar. According to a design in this respect, the control unit is designed to determine whether one of the switches is defective on the basis of the supply voltages applied to the supply lines. For this purpose, voltage measuring devices connected to the control unit can tap the voltage at each of the supply lines in particular. From the supply voltage of one of the supply lines, the control unit can determine whether the switch belonging to this supply line is defective. If, for example, the control unit gives the switch the command to close, but the associated supply line has no voltage, the switch may be defective.

According to one design, the control unit is designed as part of the battery management system. As mentioned above, the battery management system can therefore include the functionalities of the control unit.

Figure 2:
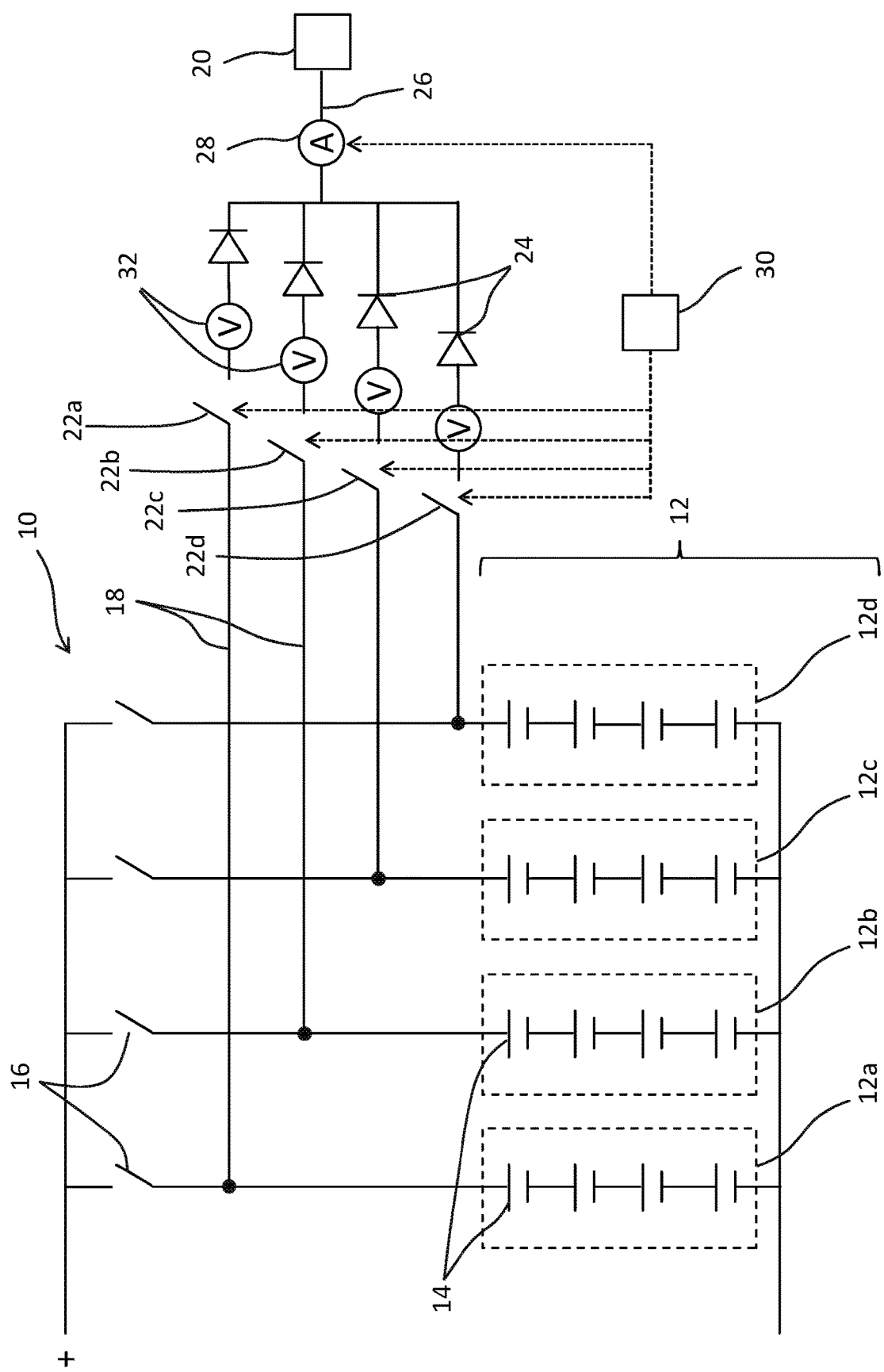

Two design examples of the disclosed embodiments are explained below by means of figures. They show schematically:

FIG. 1 is a supply circuit for a battery of an industrial truck according to a first design, and FIG. 2 is a supply circuit for a battery of an industrial truck according to a second design.

Unless otherwise indicated, identical reference symbols are used in the following to designate identical objects.

FIG. 1 shows a supply circuit for the power supply of an industrial truck according to a first design. The power supply circuit comprises a battery 10 with battery stacks 12*a* to 12*d*, designated together with the reference sign 12, each of which has several battery cells 14. In this design example, the battery 10 comprises four battery stacks 12*a* to 12*d*, each with four battery cells. However, this is to be understood purely schematically. The battery can also have any other number of battery stacks, which can have any other number of battery cells. Via switch 16, the individual battery stacks 12a to 12d can optionally be connected to non-displayed loads, such as a drive of the industrial truck. The individual battery stacks 12 are connected to a battery management system 20 via supply lines 18. Each of the supply lines 18 has a switch 22, see switches 22a to 22d. Between their switch 22 and the battery management system 20, the supply lines 18 also have a diode 24 each. Between the diodes 24 and the battery management system 20, the supply lines 18 converge to a common supply line 26, which leads to the battery management system 20 and comprises a current meter 28.

According to the one embodiment, a control unit 30 is provided which is designed to connect the battery stacks 12a to 12d to the battery management system 20 or to disconnect them from it. The control unit 30 is designed to control the switches 22a to 22d for this purpose. The switches can be, for example, transistors or relays. The control unit 30 can control the switches 22 independently, whereby the effect of the control unit 30 on the switches 22 is shown by dotted arrow lines. For example, the control unit 30 can connect the battery stack 12a to the battery management system 20 by flipping switch 22a. The control unit 30 can also establish the connection between the battery stacks 12b to 12d and the battery management system 20 by flipping the other switches 22b to 22d. This enables the individual battery stacks 12 to be switched on and off separately from the power supply of the battery management system 20. Thus it can be reliably determined at any time which of the battery stacks 12 feeds the battery management system. This in turn leads to a reliable determination of the state of charge of the battery stack connected to the battery management system, especially if only one battery stack is connected to the battery management system.

The state of charge of the connected battery stack can be determined, among other things, from the supply current determined via the meter 28 and flowing through the respective supply line 18 to the battery management system 20. This supply current can be determined via the current meter 28 and tapped by the control unit 30, as shown by the dotted arrow line. The voltage applied to the connected supply line 18 and/or the cell voltages of the battery cells 14 can also be taken into account for determining the state of charge.

Switching, i.e. the optional connection or disconnection of the battery stacks to or from the battery management system, can be carried out depending on various system parameters, for example depending on the state of charge of the battery stacks. If, for example, the state of charge of the battery stack 12a is greater than the state of charge of the remaining battery stacks 12b to 12d, the battery management system 20 can only be supplied via the battery stack 12a. The control unit 30 can close switch 22a for this purpose. The stack voltages or cell voltages can also be used as parameters for switching without first determining the state of charge of the battery stacks. The control unit can also switch the different battery stacks 12 with the battery management system 20 depending on a time parameter, for example, or depending on the current energy requirement of the battery management system 20, by flipping the switches 22 with the battery management system 20. For example, it can be envisaged that the control unit 30 switches on all battery stacks 12 to supply the battery management system 20 during a start-up phase of the battery management system 20. At the end of the start-up phase, for example, the control unit can disconnect battery stacks 12b to 12d from the battery management system 20 by opening switches 22b to 22d, so that the battery management system 20 is only supplied with energy via battery stack 12a. After a defined period of time—e.g. 10 minutes—the control unit 30 can finally close switch 22b and open switch 22a, so that the battery management system 20 is only powered by battery stack 12b. Accordingly, the other battery stacks 12 can also be switched alternately, in particular all battery stacks can be switched through alternately several times. This ensures that the battery stacks 12 all contribute evenly to the energy supply. The battery cells 14 of the individual battery stacks 12 are discharged evenly and there is no excessive load on individual battery stacks.

The diodes 24 prevent the flow of unwanted compensation currents between the battery stacks 12 in the event that several battery stacks 12 are simultaneously connected to the battery management system 20.

The design in FIG. 2 differs from the design in FIG. 1 only in that a voltmeter 32 is provided between the switches 22 and the diodes 24 in each of the supply lines 18. Reading the voltage values, the control unit 30 can determine whether one of the switches 22 is defective. If, for example, one of the switches 22 is closed due to actuation by the control unit 30, but the associated voltmeter 32 does not determine a voltage value, then a defective switch can be inferred from this.

LIST OF REFERENCE (NUMERICAL) CHARACTERS 10 battery
12 battery stacks
12a-12d battery stacks
14 battery cells
16 switches
18 supply lines
20 battery management system
22 switches
22a-22d switch
24 diodes
26 common supply line
28 current meter
30 control unit
32 voltmeters

What is claimed is:
1. An industrial truck comprising:
a battery; and
a battery management system connected to the battery and powered by the battery, the battery comprising a plurality of battery stacks each having battery cells connected in series with each other, characterized by a control unit adapted to selectively connect one or more of the battery stacks to the battery management system or to disconnect it from the battery management system, wherein the control unit is configured to:
selectively connect the battery stacks to the battery management system or to disconnect the battery stacks from the battery management system in each case as a function of the states of charge of the respective battery stacks, and
factor at least one of the following sets of parameters to determine the state of charge: stack voltages of the battery stacks and cell voltages of the battery cells.

2. The industrial truck according to claim 1, wherein the control unit is further configured to factor the supply current of the battery management system for determining the state of charge.

3. The industrial truck according to claim 2, wherein a current meter is arranged in a common supply line leading from the battery stacks to the battery management system.

4. The industrial truck according to claim 1, wherein the control unit is configured to: connect or disconnect the battery stacks to or from the battery management system in dependence on one or more of the following sets of parameters: time, energy demand of the battery management system, stack voltages of the battery stacks, cell voltages of the battery cells.

5. The industrial truck according to claim 4, wherein supply lines running between the battery stacks and the battery management system each have a switch, the control unit being configured to control the switches independently of one another.

6. The industrial truck according to claim 5, wherein the control unit is designed to determine whether one of the switches is defective by means of the supply voltages applied to the supply lines.

7. The industrial truck according to claim 5, wherein the control unit is part of the battery management system.

* * * * *